United States Patent
Otto et al.

(10) Patent No.: US 8,044,752 B2
(45) Date of Patent: Oct. 25, 2011

(54) HIGH-CURRENT, COMPACT FLEXIBLE CONDUCTORS CONTAINING HIGH TEMPERATURE SUPERCONDUCTING TAPES

(75) Inventors: Alexander Otto, Chelmsford, MA (US); Ralph P. Mason, Chelmsford, MA (US); James F. Maguire, Andover, MA (US); Jie Yuan, South Grafton, MA (US)

(73) Assignee: American Superconductor Corporation, Devens, MA (US)

( * ) Notice: Subject to any disclaimer, the term of this patent is extended or adjusted under 35 U.S.C. 154(b) by 496 days.

(21) Appl. No.: 11/880,567

(22) Filed: Jul. 23, 2007

(65) Prior Publication Data
US 2008/0180202 A1    Jul. 31, 2008

Related U.S. Application Data

(60) Provisional application No. 60/832,716, filed on Jul. 21, 2006.

(51) Int. Cl.
*H01F 6/00* (2006.01)
(52) U.S. Cl. ............ 335/216; 174/15.5; 174/125.1; 505/220; 505/231; 505/705; 505/879; 505/884; 505/885; 505/886; 505/887
(58) Field of Classification Search ............ 335/216; 174/15.4, 15.5, 125.1; 505/230, 231, 813, 505/879, 884–887, 220, 705
See application file for complete search history.

(56) References Cited

U.S. PATENT DOCUMENTS
| | | | |
|---|---|---|---|
| 5,426,408 A | 6/1995 | Jones et al. | |
| 6,397,454 B1 * | 6/2002 | Seuntjens et al. | 29/599 |
| 2003/0205403 A1 | 11/2003 | Tanaka et al. | |

FOREIGN PATENT DOCUMENTS
| | | | |
|---|---|---|---|
| DE | 2205045 A1 * | 8/1973 | |
| EP | 0798749 | 10/1997 | |
| JP | 56098354 A * | 8/1981 | |
| JP | 09-223418 | 8/1997 | |
| KR | 10-049057 | 12/2003 | |

OTHER PUBLICATIONS

Fukushima, K. et al., "Fabrication and transport properties of Bi2212/Ag prototype magnets for 1 GHz-NMR magnet system," Physica C 357-360 (2001) 1297-1301.

Ohata, K. et al., "Effect of filament size on superconducting properties of the Bi-2212 ROSATwire," Physica C 357-360 (2001) 1107-1110.

Okada, M., "HTS High Field Magnets," Proc. 16th Inter. Conf. On Magnet Technology MT-16 Sep. 26-Oct. 2, 1999, Ponte Bedra Beach, FL.

(Continued)

*Primary Examiner* — Ramon Barrera
(74) *Attorney, Agent, or Firm* — Occhiuti Rohlicek & Tsao LLP

(57) ABSTRACT

High-current, compact, flexible conductors containing high temperature superconducting (HTS) tapes and methods for making the same are described. The HTS tapes are arranged into a stack, a plurality of stacks are arranged to form a superstructure, and the superstructure is twisted about the cable axis to obtain a HTS cable. The HTS cables of the invention can be utilized in numerous applications such as cables employed to generate magnetic fields for degaussing and high current electric power transmission or distribution applications.

21 Claims, 18 Drawing Sheets

OTHER PUBLICATIONS

Sato, J., et al., "Two kilometer long Bi-2212 ROSAT wires," Physica C 357-160 (2001) 11111-1114.

Tanaka, K., et al., "Fabrication of Bi-2212 ROSATwire with reduced silver content," Physica C 357-360 (2001) 1102-1106.

Wakuda, T., "A new reinforced winding of Bi-2212 coils for 30 T class superconducting magnets," Physica C 357-360 (2001) 1293-1296.

American Superconductor Demonstrates World's First Full-Scale High Temperature Superconductor Degaussing Cable for Military Ships [online] (Apr. 4, 2006) [Retrieved on Feb. 4, 2008]. Retrieved from the internet <http://phx.corporate-ir.net/phoenix.zhtml?c=86422&p=irol-newsArticle_Print&ID=838425&highlight>.

* cited by examiner

Native HTS Tape

Plated HTS Tape

Lamination Reinforced HTS Tape

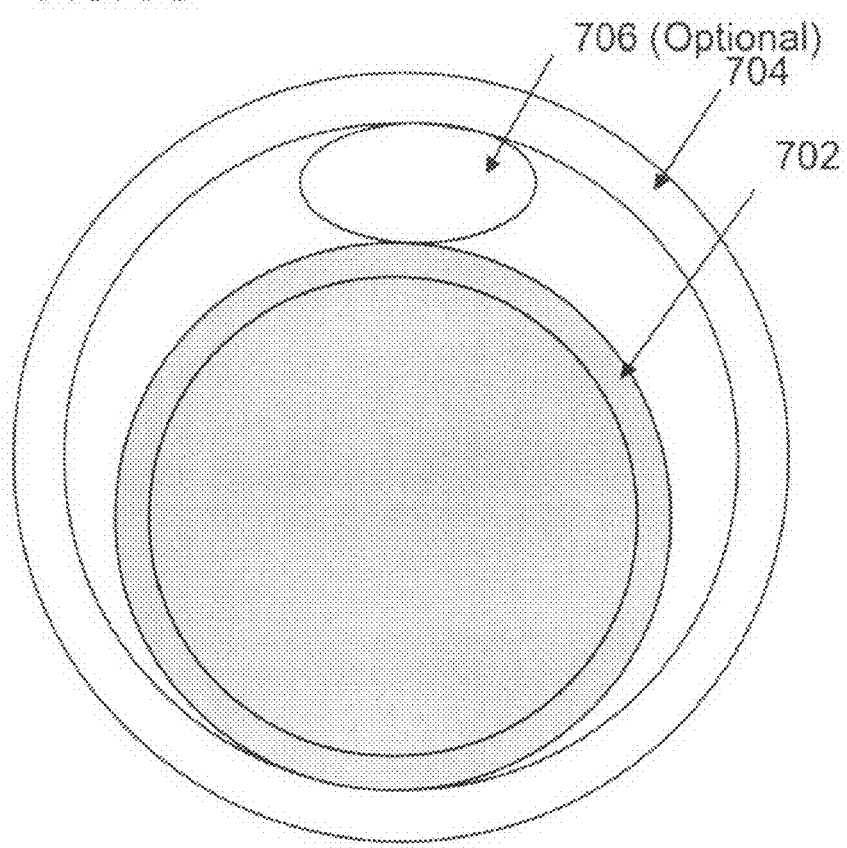

HIGH-CURRENT, COMPACT FLEXIBLE CONDUCTORS CONTAINING HIGH TEMPERATURE SUPERCONDUCTING TAPES

CROSS-REFERENCE TO RELATED APPLICATIONS

The present application claims the benefit of the filing date of U.S. Provisional Patent Application No. 60/832,716, filed Jul. 21, 2006, the content of which is hereby incorporated by reference herein in its entirety.

FIELD OF THE INVENTION

The present invention relates to high-current-carrying, flexible conductors. More particularly, the present invention relates to high-current-carrying, flexible conductors containing high temperature superconducting materials.

BACKGROUND OF THE INVENTION

Lightweight conductors that can transmit large amounts of electric currents without significant loss are being sought in numerous applications. For example, in many electrorefining applications (e.g., aluminum production processes), high amounts of currents are required. Other applications requiring lightweight, high-current conductors include naval ships. Ships are currently outfitted with a complex system of coiled cables (called degaussing cables) to reduce the magnetic field developed on the ship's body that are typically made of ferromagnetic materials. This allows the ships to evade magnetic mines that explode upon sensing a change in the magnetic field. To accommodate the high-current requirements in exemplary applications described above, large diameter wires, typically made of copper or aluminum, are generally utilized. However, this leads to undesirably heavy, bulky, and inflexible cables. Cables having lowered weight and increased flexibility that can carry large amounts of electric currents without significant loss have not yet been realized.

SUMMARY OF THE INVENTION

The present invention is generally directed to high-temperature superconducting (HTS) cables and methods for making the same. In accordance with certain embodiments of the present invention, the HTS cable affords greater flexibility, reduced weight, and high current carrying capacity which affords significant advantages over those of the prior art.

In accordance with certain embodiments of the present invention, a HTS cable can include a plurality of high-temperature superconducting (HTS) tapes stacked substantially coplanar to a plane formed by the width and the length of individual HTS tapes to form an HTS stack, wherein an individual HTS tape of the HTS stack is displaced a distance in the width direction from a second HTS tape positioned above the individual HTS tape in the HTS stack. Moreover, a plurality of HTS stacks can be arranged to form a superstructure that is twisted about the cable axis.

Methods of making the HTS cables are also described herein. In accordance with certain embodiments of the present invention, the method can include arranging a plurality of high-temperature superconducting (HTS) tapes substantially coplanar to a plane formed by the width and the length of individual HTS tapes to form an HTS stack, wherein an individual HTS tape of the HTS stack is displaced a distance in the width direction from a second HTS tape positioned above the individual HTS tape in the HTS stack. Moreover, the method can include arranging a plurality of HTS stacks into a superstructure and twisting the superstructure about the cable axis.

In accordance with certain embodiments of the present invention, cables employed to generate magnetic fields, such as a degaussing cable, are also described. The magnetic-field generating cable can include at least one cable that has a plurality of high-temperature superconducting (HTS) stacks arranged to form a superstructure, said HTS stacks comprising a plurality of HTS tapes substantially coplanar to a plane formed by the width and the length of individual HTS tapes, wherein an individual HTS tape of the HTS stack is displaced a distance in the width direction from an HTS tape positioned above the individual HTS tape in the HTS stack, wherein at least one end of the plurality of HTS tapes is connected in series with an end of another HTS tape located in any one the plurality of HTS stacks.

In accordance with certain embodiments of the present invention, the magnetic-field generating cable of the present invention can be utilized in a degaussing system. The degaussing system can include, in addition to the magnetic-field generating cable of the present invention, a cooling system for maintaining the HTS tapes in a superconducting state and a power supply for providing a controlled current into the HTS tapes

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 7C shows a schematic of a magnetic-field generating cable having a single HTS cable inside a small diameter cryostat, with an optional spacer;

DETAILED DESCRIPTION OF THE INVENTION

The present invention provides robust, flexible, lightweight, and compact high temperature superconducting (HTS) cables. In certain embodiments, HTS cables of the present invention can be fabricated by assembling certain number of HTS tapes into desired configurations.

As used herein, 'cable' refers to a plurality of HTS tapes arranged or assembled to form a flexible multi-tape assembly. A cable includes a single HTS stack arranged as described herein or a plurality of HTS stacks arranged to form a superstructure.

As used herein, a high temperature superconductor refers to materials that can maintain its superconducting behavior at temperatures of 20 K and higher (i.e., critical temperature, $T_c \geq 20$ K). For example, high-temperature superconductors maintain their superconducting behavior when liquid nitrogen at about 1 atmosphere pressure is utilized as the coolant (e.g., about 77 K). Superconducting materials also exhibit a critical current, $I_c$, which is the current below which the material maintains its superconducting behavior. Examples of high temperature superconductors include copper oxide superconductors such as bismuth strontium calcium copper oxide (BSCCO) and yttrium barium copper oxide (YBCO) type superconductors and others such as magnesium diboride ($MgB_2$).

In certain embodiments, HTS tapes can be prepared using well-known conventional methods, for example, such as described in US Patent Publication No. 2003/0062659, which is hereby incorporated by reference herein in its entirety. For example, HTS tapes, such as BSCCO tapes, can be prepared by loading powders (either a precursor or the actual HTS powders) into a metallic (typically silver) tube, drawing the tube into a wire of smaller dimensions, repacking the wire into another metallic tube with other wires, drawing the repacked tube, and repeating the repacking and drawing step until at least one dimension of the drawn-down filament has obtained a desired dimension. Then, a rolling mill can be utilized to flatten the filament into a tape shape by passing the filament between a pair of counter-rotating high strength metal cylinders. Subsequently, a heat treatment step can be carried out to form the desired HTS tape.

In other embodiments, HTS tapes can be prepared as described using known methods, for example, such as those described in U.S. Patent Publication No. 2005/0159298, U.S. Patent Publication No. 2006/0040830, and U.S. Patent Publication No. 2006/0073979, which are hereby incorporated by reference herein in their entirety. For example, HTS tapes, such as YBCO tapes, can be prepared by preparing a flexible metal or metal alloy substrate having a desired texture, depositing a buffer layer on the substrate, depositing a YBCO precursor material on top of the buffer layer, heat treating the precursor material to form the YBCO HTS material, and depositing an overcoat of noble metal on top of the YBCO material.

Figure 1A:
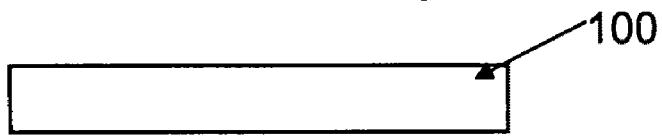
FIGS. 1A, 1B and 1C are schematic diagrams of some exemplary types of HTS tapes that can be utilized in HTS cables in accordance with certain embodiments of the present invention.
Figure 1B:
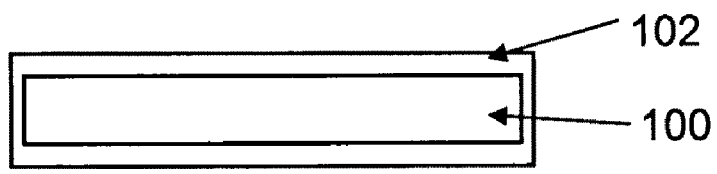
Figure 1C:
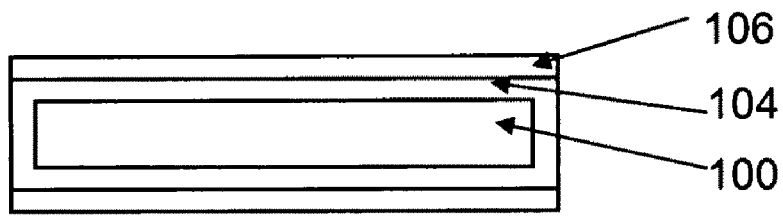

Various different types of HTS tapes may be utilized to produce the HTS cables of the present invention. Some exemplary HTS tape structures are shown in FIG. 1. For example, HTS tapes described above can be schematically illustrated as HTS tape 100 as shown in FIG. 1A. HTS tape 100 shown in FIG. 1A may further be plated or coated with a metal or insulating layer 102 in order to improve mechanical properties as well as provide environmental and thermal stability. Typical thicknesses of metal layers are up to about ½ the thickness of the tape, and metals may include, for example, copper, silver, nickel or alloys like copper-zinc or copper-nickel as shown in FIG. 1B. Alternatively, HTS tapes 100 shown in FIG. 1A may be provided with solder 104 surrounding the HTS tape 100 and further provided with reinforcing strips 106 on each side of the HTS tape 100 as shown in FIG. 1C. For example, reinforcing strips 106 may include metals like stainless steel, copper and copper alloys like brass or monel, molybenum, and the like. Reinforcing strips 106 may be joined to HTS tapes 100 (with or without metal layer 102) using any conventional or convenient method. One exemplary method includes joining the strip to the HTS tape 100 with solder 104, for example, by passing the HTS tape 100 and reinforcing strip 106 through a solder bath and pressing the solder-coated pieces together. HTS tapes having varying dimensions may be used. However, typical HTS tapes before reinforcement have a width of about 3 to 5 mm and a thickness of about 0.13 to 0.27 mm. After reinforcement, the HTS tapes typically have a width of about 3 to 5.5 mm and a thickness of about 0.19 to 0.7 mm. As used herein, the term HTS tapes is intended to encompass any of the suitable HTS tapes.

Figure 2:
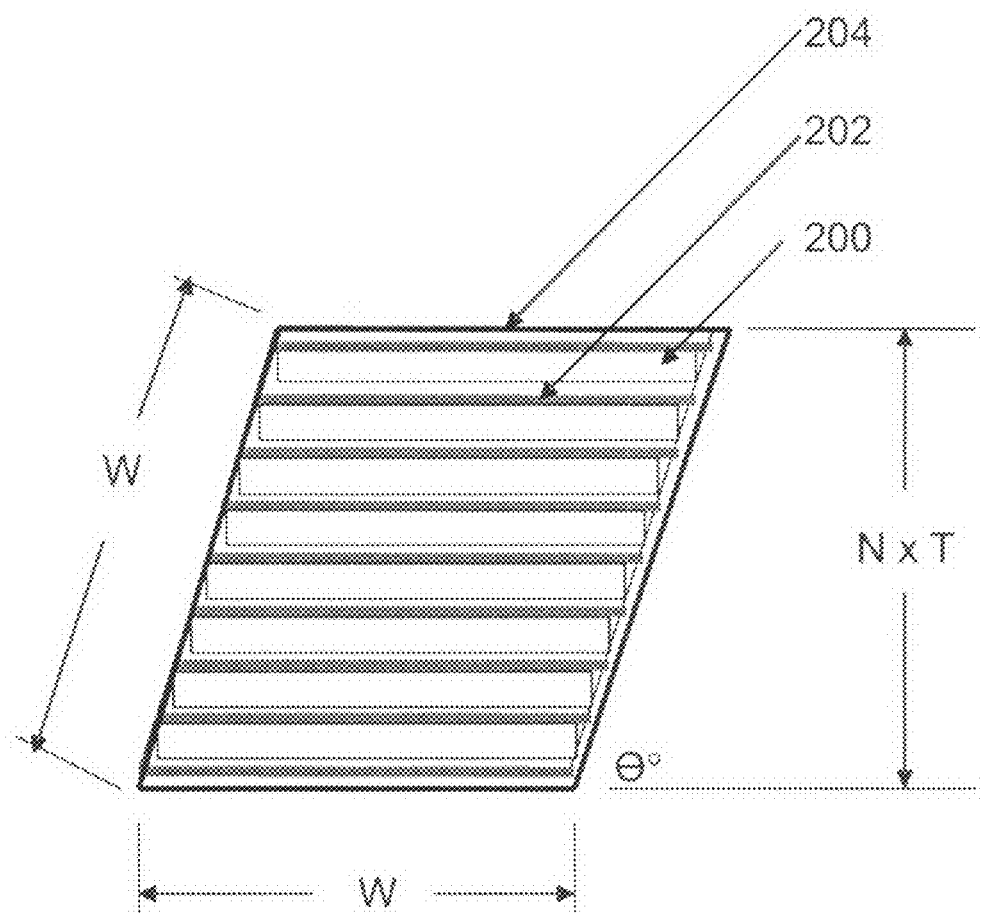
FIG. 2 is a schematic diagram showing the assembly of HTS tapes into rhomboidal stacks in accordance with certain embodiments of the present invention.

As shown in FIG. 2, appropriate number of HTS tapes can be stacked and assembled to form a cable according to certain embodiments of the present invention. For example, any number of HTS tapes 200 (5, 10, 25, 50, etc.) can be stacked to form an HTS stack. By way of example, the HTS tapes may be arranged to form a parallelogram stack or rhomboidal stack. As used herein, a rhomboidal stack means a stack containing HTS tapes where the stack has a cross-sectional shape that is substantially rhomboidal and a parallelogram stack means a stack containing HTS tapes where the stack has a cross-sectional shape that substantially forms a parallelogram. For example, the edges of the rhombohedral cross-section can be approximately equal in length to each other, the opposing edges can be approximately parallel to each other, and the angles formed by the edges need not be perpendicular to each other. FIG. 2 is a cross-sectional view of assembled HTS tapes 200, illustrating a stacking arrangement resulting in a substantially rhombohedral cross-section, i.e., a "rhomboidal stack." As used herein, a substantially rhombohedral cross-section refers to a quadrilateral where all four sides are substantially equal in length (e.g., differences in length ranging from 0% to 20% may be acceptable) and none of the four interior angles of the rhombus are 90° (e.g., two 450 and two 135° interior angles, two 60° and two 120° interior angles, two 62° and two 118° interior angles, etc.). The HTS tapes 200 can optionally be stacked with a compliant material 202 placed in between two adjacent HTS tapes 200. The compliant material 202 may be a conductor, a semiconductor, or an insulator. Each rhomboidal stack can contain approximately N total number of HTS tapes 200, where N is defined as $$N = \frac{W}{T}\sin\theta,$$

and W is the width of the HTS tape, θ is the incline angle of the rhomboidal cross-section (e.g., θ~60°), and T is the thickness of the HTS tape. Note, the thickness of the HTS tape (T) may include the thickness of the metal layer 102, solder 104, reinforcing strip 106, and/or compliant material 202 surrounding the HTS tape 200. The rhomboidal stack can then be held together by any appropriate means 204, such as helical or cylindrical wrapping of the rhomboidal stack 200 with polymer, paper, metal foil strip, and/or the like. In certain embodiments, HTS tape 200 may further be covered, coated, and/or wrapped with insulating material such as polyimide films (KAPTON), fluoropolymers (TEFLON), coated varnish, lacquer, enamel, methacrylates (polymethyl methacrylate), epoxies (UV curable epoxy), and the like. In other embodiments, HTS tape may be covered, coated, and/or wrapped with a semiconducting material such as graphite impregnated paper, graphite impregnated polymer film, conductive polymer films (polythiophene films), low conductivity metallic alloys, intermetallic films, and the like.

In certain embodiments, the rhomboidal stack may further be assembled into superstructures, such as a hexagonal structure. As used herein, a superstructure refers to a structure that is formed by assembling together the HTS stacks. For example, a hexagonal structure refers to a plurality of HTS stacks (e.g., rhomboidal stacks) assembled to form a cable having a substantially hexagonally-shaped cross-sectional geometry. The assembly may include, for example, three rhomboidal stacks (H1 stack; see FIG. 3A), 12 rhomboidal stacks (H2 stack; see FIG. 3B), 27 rhomboidal stacks (H3 stack), 48 rhomboidal stack (H4 stack), and the like, the actual number of rhomboidal stacks being selected to form an assembly that provides a circumferential hexagonal geometry.

In certain embodiments, the rhomboidal stacks may be arranged into superstructures so that the HTS tapes are nearly parallel (as much as possible) to the nearest swept circular perimeter of the hexagonal superstructure. The hexagonal structure can be held in place by any suitable means. One preferred method is wrapping, with, for example, a polymer tape or preformed helix. The wrap can provide sufficient compression to maintain the integrity of the assembly without exerting too much pressure to damage or restrict its motion and flexibility.

It should be noted that the rhomboidal-shaped stack is readily filled with HTS tapes of substantially similar width and thickness to a high fill factor which can then be arranged to form a hexagonal superstructure with a high fill fraction of HTS tape on its cross-section. This reduces the effective radius of the conductor, increasing its current density and bend tolerance.

Figure 3A:
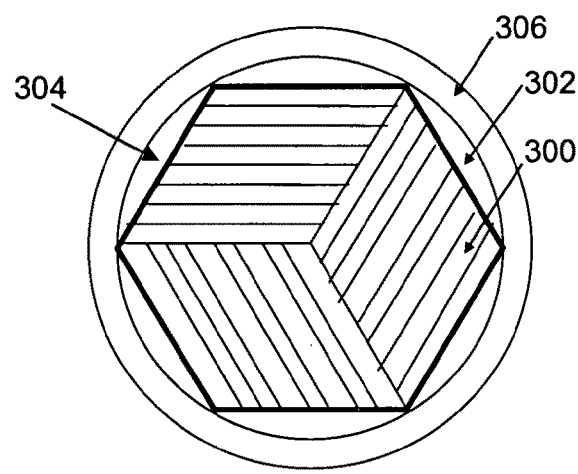
FIGS. 3A through 3E are schematic diagrams of some exemplary ways of assembling the rhomboidal stacks into HTS cables in accordance with certain embodiments of the present invention.
Figure 3B:
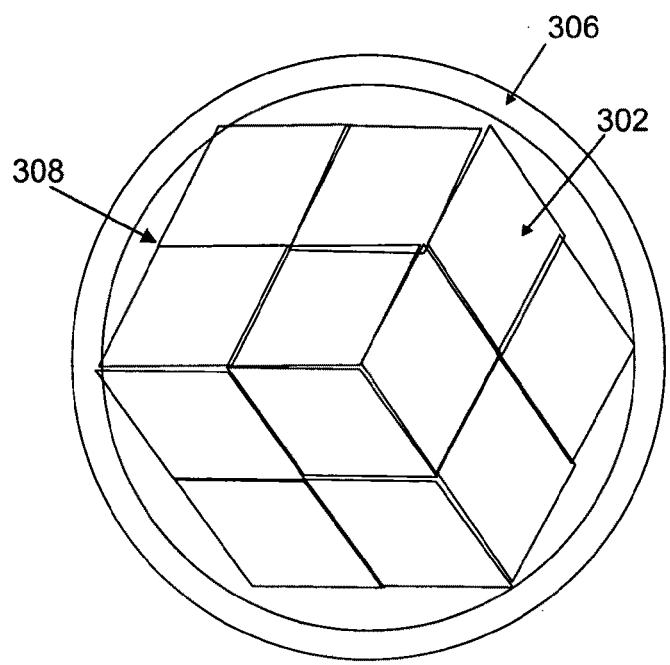
Figure 3C:
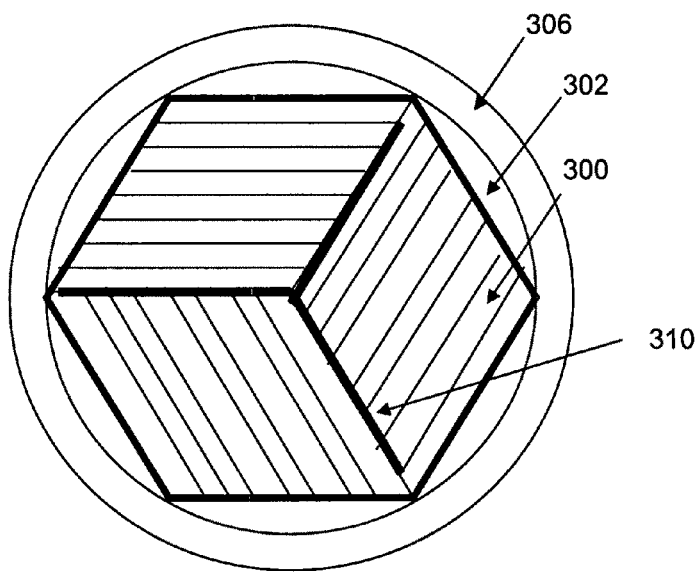

In certain embodiments, the superstructure may be formed using a superstructure former 308 that aids in the formation of the superstructures from rhomboidal stacks as shown in FIG. 3C. For example, a suitable superstructure former may be an elongated positioner with a central axis and three ribs projecting from the central axis spaced 120 degrees apart from each other that promotes the superstructures to be held in place prior to wrapping or encasing.

In certain embodiments, as shown in FIG. 3A, individual HTS tape 300 are grouped (with optional interleaved compliant material 202 not shown) to form a rhomboidal stack 302, three rhomboidal stacks 302 may be assembled together to form a hexagonal structure of H1 stack 304. The H1 stack 304 may be held together by any appropriate means 306, such as helically or cylindrically wrapping with insulated wire, insulated tape, metal foils, helical slit plastic conduit, and the like.

Figure 12:
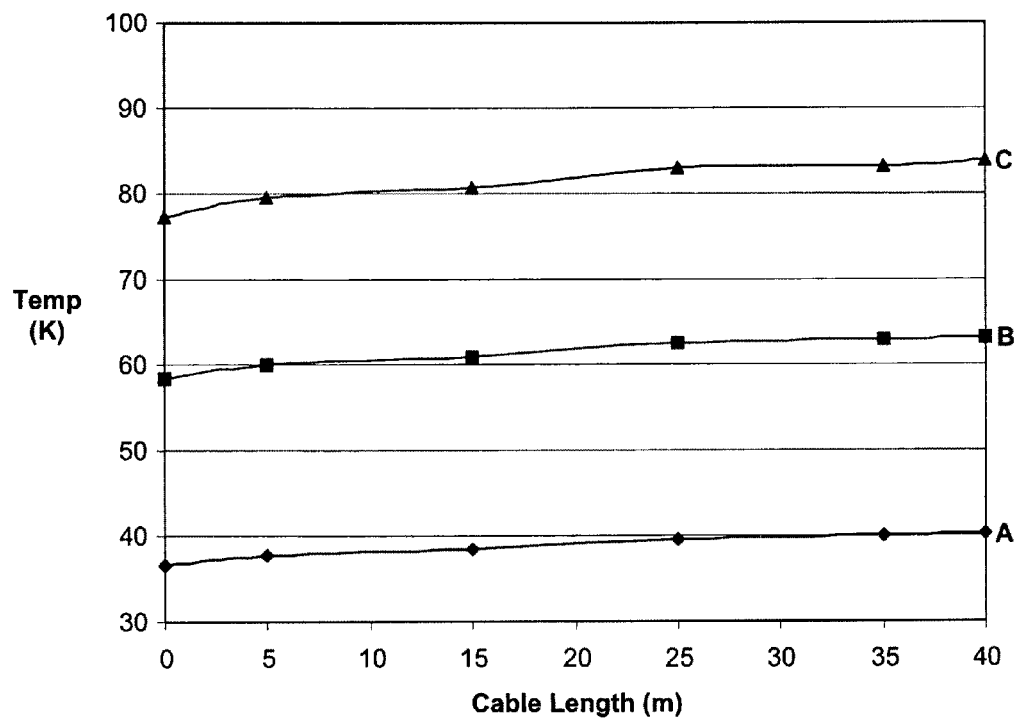
FIG. 12 shows the temperature difference at different locations of a magnetic-field generating cable at different operating temperatures in accordance with certain embodiments of the present invention.

In other embodiments, multiple rhomboidal stacks 302 may be joined to form larger structures. As shown in FIG. 3B, 12 rhomboidal stacks 302 may be assembled together to form a larger hexagonal structure (H2 stack 308). In these H2 stack structures, the center 3 rhomboidal stacks may be wrapped first, followed by assembly and wrapping of the next layer on top to form the H2 stack 308. Alternatively, the entire assembly may be assembled and wrapped in one pass. Such an arrangement may lead to about 3-4 fold increase in the current capacity of the HTS cables. It should be noted that the current capacity of the HTS cables may be increased by other methods. For example, the critical current ($I_c$) for each HTS tape can be increased by, for example, lowering the temperature. Furthermore, the cross-sectional area of each HTS tape can be increased to increase the current of the HTS cable. Other suitable arrangement tailored to specific design criterion will be readily apparent to one of ordinary skill in the art. The individual HTS tapes, as well as the rhomboidal elements comprising a cable may be uniquely marked by, for example, use of different color wrap material, or patterning. In certain cases, such unique marking may allow for simple identification of the tapes when making end-to-end connections.

Upon forming a suitable hexagonal structure as described above, the entire hexagonal structure may be rotated about the cable axis, i.e., an axis that is perpendicular to the plane of the hexagonal cross-sectional structure, to obtain a HTS cable having a twist along its cable axis. The twist may be imparted so that the pitch is in a continuous spiral mode or in an oscillating mode. For example, in the spiral mode, the cable can be twisted in one direction about its axis throughout the length of the cable. In the oscillating mode, the cable can be first twisted locally in one direction about its axis to, for example, a full 360 rotation. Then an adjacent region may be twisted in the reverse direction about its axis to, for example, a full 360 rotation. Such change in the direction of twist can be continued back and forth along the length of the cable. Suitable approaches that can provide advantage of simple manufacturing will be readily apparent to one of ordinary skill in the art. In certain embodiments, the hexagonal structure may be "overtwisted" to account for the spring back effect of the material. For example, if a twist pitch of 1 twist per meter is desired, the hexagonal structure may be twisted to initially have 1 twist per 1 meter, 1.5 twists per 1 meter, 2 twists per 1 meter, 3 twists per 1 meter, 5 twists per 1 meter, 7 twists per 1 meter, 10 twists per 1 meter, and the like. Such excess twisting may allow for the HTS cable to relax to the target twist pitch value (e.g., 1 twist per 1 meter pitch).

Although not wishing to be bound by theory, imparting a twist along the axis of the HTS cable may provide the following benefits. First, the twist may impart improved flexibility to the HTS cable due to the reduction of required bending forces. Second, the twist may impart improved bend tolerance to smaller diameters before damage to the HTS cable (as measured by $I_c$ degradation) due to local strain compensation taking place. Third, the twist may impart reduced power loss to the HTS cable when operating in an ac or ramped field mode, especially if combined with insulation or semiconducting separation layer between each HTS tapes.

Figure 3D:
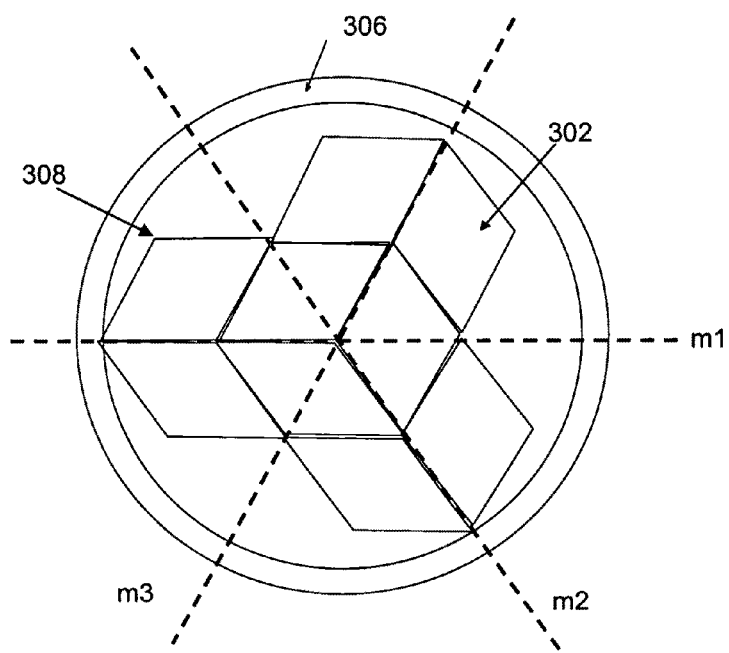

Although the present invention was described above in connection with rhomboidal stacks and hexagonal superstructures, it should be noted that the present invention is not limited to rhomboidal stacks and/or hexagonal superstructures. Any suitable shape of the stacks and/or superstructures may be chosen. For example, stacks in the shape of a parallelogram, trapezoid, triangle, and the like should also be understood to be encompassed by the present invention as will be readily apparent to one of ordinary skill in the art. Moreover, any suitable superstructure, such as a parallelogram superstructure (e.g., two rhomboidal stack assembled side-by-side), a rhombus superstructure (e.g., four rhomboidal stack assembled together), and the like may be encompassed by the present invention. In certain embodiments, a superstructure having a three-fold mirror symmetry may be formed. A hexagonal structure described is an example of a superstructure having a three-fold mirror symmetry. However, other superstructures having a three-fold mirror symmetry are also encompassed by the present invention. For example, FIG. 3D shows a structure having a three-fold mirror symmetry about the three dotted lines m1 through m3, which is a hexagonal structure with three of the rhomboidal stacks removed. Various different superstructures having a three-fold mirror symmetry will be readily apparent to one of ordinary skill in the art.

In certain embodiments, shapes of stacks and superstructures may be chosen to obtain simplicity of manufacture, high degree of cross-section occupancy by HTS tape resulting in a high current density, reduced effective diameter of the superstructure, and improved overall bend tolerance.

In certain embodiments, the stacks may be aligned to maximize regions where the large surface area portion of the HTS tapes are as close to parallel to the overall swept perimeter of the HTS cable to minimize the perpendicular magnetic field component of the cable acting on each HTS tape. Without wishing to be bound by theory, the perpendicular magnetic field component may decrease the critical current more than the parallel magnetic field component. Hence, the configuration where the large surface area portion of the HTS tapes are nearly parallel to the overall swept perimeter of the HTS cable may be more beneficial.

Figure 3E:
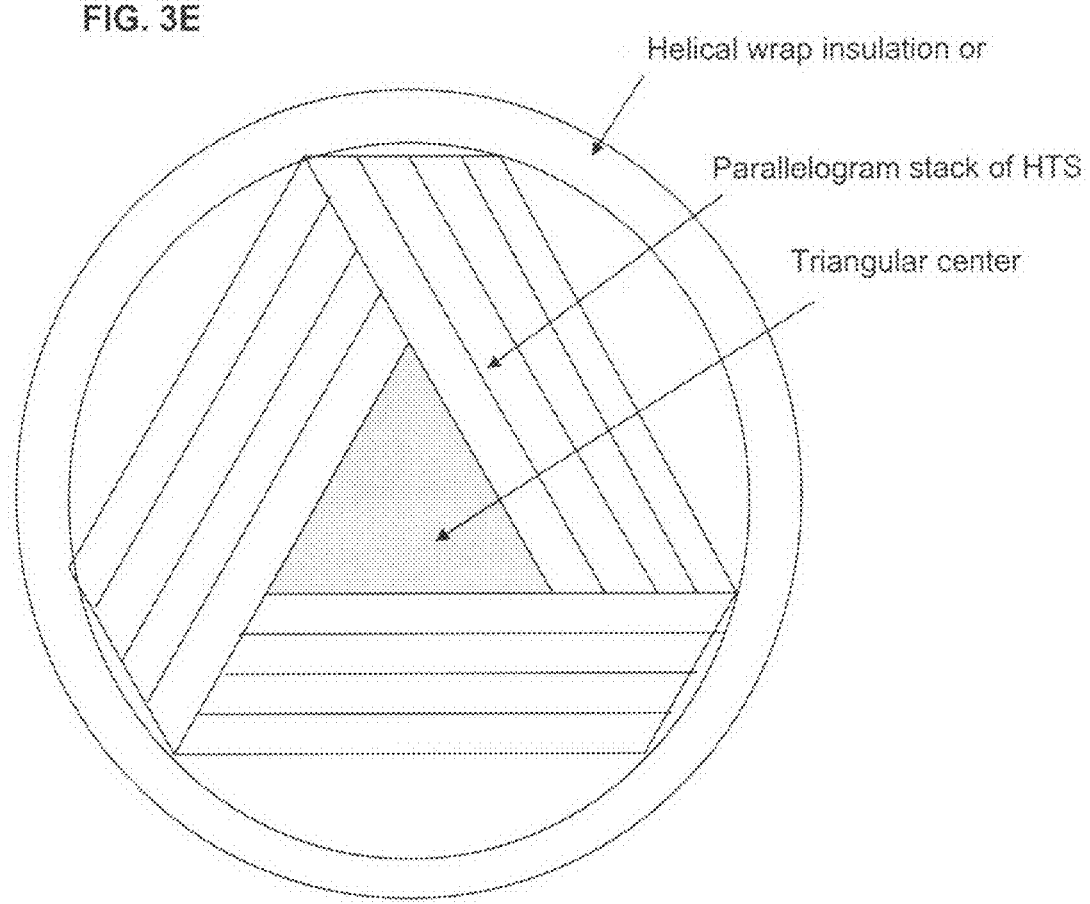

For example, parallelogram cross-sectioned stacks 310 may be used to form a triangular superstructure as shown in FIG. 3E. As shown, the parallelogram stacks may be formed with the inclined edge of the stack being somewhat smaller than its base width. Three of these parallelogram stacks can then be formed into a triangular superstructure 312 using, for example, a superstructure former 314 that is triangular in shape as shown in FIG. 3E. However, any suitable superstructure formers 314 may be utilized, such as a superstructure former 314 having a round or polygonal cross-section.

Applications

HTS cables of the present invention may be utilized in a number of different applications. For example, HTS cables of the present invention may be utilized in high current electric power transmission or distribution applications. HTS cables may be employed to transmit electric power from one location to another as externally or internally insulated jumper or extension cables. HTS cables can also be employed as part of an electric power transmission or distribution grid, operated in either ac or dc modes. HTS cable may also be employed to transmit electric power in electrorefineries (such as an aluminum production plant) where large amount of dc current is needed to smelt alumina into aluminum, or electrorefine (purify) copper or zinc. In these applications, currents may typically range from several thousand amps in flexible leads attached to, for example, electrodes, to as high as several hundred thousand amps in primary (flexible) bus-bar applications.

In such current-carrying applications, the HTS cable can connect two or more different terminals (i.e., current lead-ins and current lead-outs). In such a configuration, current load can be maximized or optimized by connecting the HTS tapes of the HTS cable in parallel with each other between the two or more different terminals. Moreover, additional HTS cables can be connected in parallel if necessary. The HTS cables can be placed in a suitable cryostat and insulating material to maintain HTS cable in a superconducting state through cooling. Cooled helium gas, liquid nitrogen or neon may be utilized to cool the HTS cable. The terminals connected by the HTS cables may further be designed to minimize the amount of contact resistance between the terminal and the HTS cable. In addition, the terminals may also be designed to minimize the heat transferred into the cryostat.

HTS cables of the present invention may also be utilized as lightweight, high-field, large-area magnets such as a degaussing cable. In such applications, magnetic-field generating cables with diameters too large to be practically assembled and shipped in rigid form can be manufactured on site by jacketing the HTS cable of the present invention in a flexible cryostat and wiring the individual HTS tapes in series with nearby HTS tapes to form a wound "coil." As used herein, a nearby HTS tape may refer to any HTS tapes to be connected in series. For example, nearby HTS tapes may refer to successive HTS tapes contained in a stack. However, nearby HTS may also refer to HTS tapes contained in different stacks, in different superstructures, or even in different HTS cables, as long as the ends can be connected in series with other. The current leads (i.e., terminals) into and out of the cryostat can be connected to a first end of the first HTS tape and the second end of the last HTS tape. In this manner, a high field magnets can be readily made to almost any large shape, and around almost any natural or man made objects.

Moreover, the inductances of such large magnets can be readily tuned by selecting an appropriate ratio of series versus parallel connected HTS tapes in the loop. If the magnet needs to be moved or serviced, the connected ends of the HTS tapes may be separated and the flexible, cryostat-enclosed HTS cable can be coiled up into a relatively small package that can be readily transported and re-assembled at the new location.

Figure 4A:
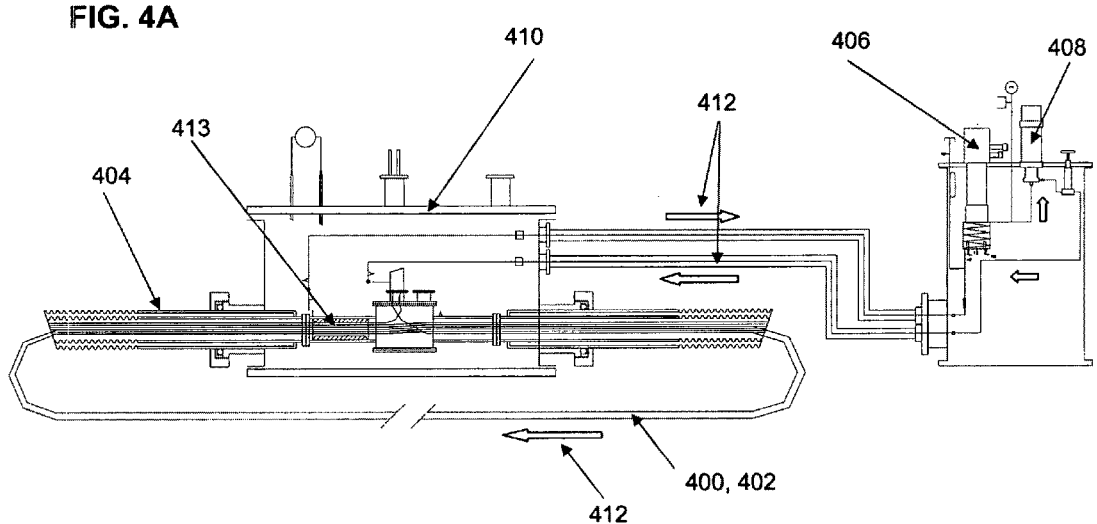
FIGS. 4A and 4B show different embodiments of a cable employed to generate magnetic fields utilizing the HTS cables in accordance with certain embodiments of the present invention.
Figure 4B:
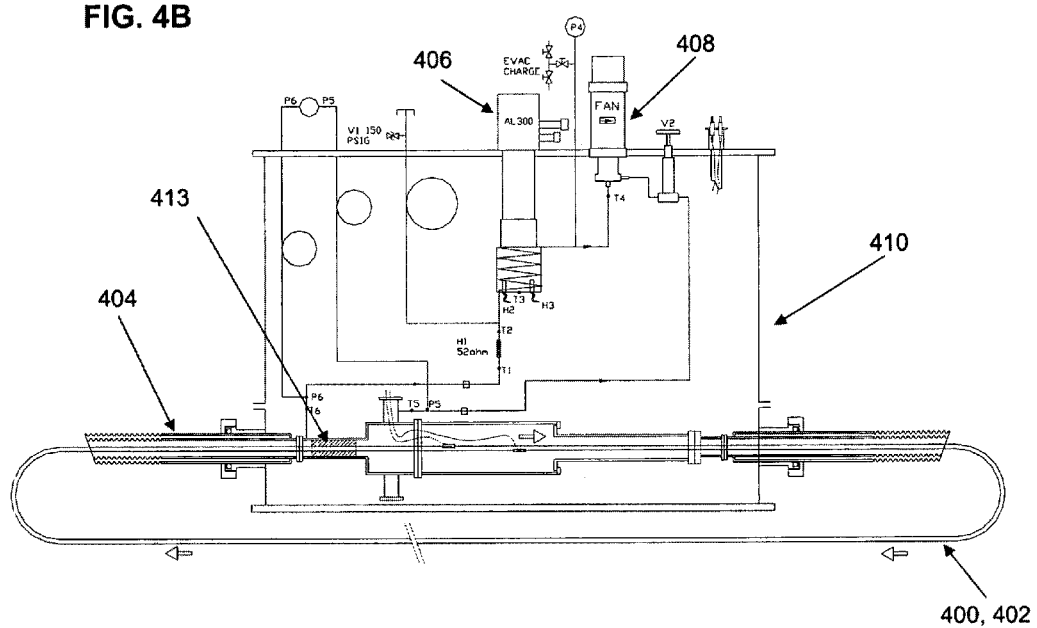

FIGS. 4A and 4B show different embodiments of how to utilize the HTS cable to generate magnetic field, where FIG. 4B depicts a more compact design. As shown, one or more HTS cables 400 may be enclosed in a flexible cryostat 404 (only a portion of the cryostat 404 is shown) where the ends of the HTS tapes 402 are connected in series, optionally in a connection box 410. The cryostat 404 may optionally contain a spacer 706 (see FIGS. 7A through 7C) to reduce movement of the HTS cable 400 in the cryostat 404. A refrigeration unit 406 can cool a suitable gas or liquid (e.g., cooled helium gas or cooled liquid nitrogen) and a pump 408 can supply the cooled gas or liquid 412 into the cryostat 404 to maintain the HTS tapes 402 in a superconducting state (see also FIGS. 7A through 7C). In order to prevent cooled helium gas from bypassing between the inlet and outlet of the cryostat, a flow restrictor 413 can be placed in HTS cable 400.

As shown in FIG. 4A, refrigeration unit 406 and pump 408 may be embodied as separate components. For a more compact design, refrigeration unit 406, pump 408, and connection box 410 may be integrated as a single component in which the unit provides the simultaneous function of cooling and providing a suitable coolant into the cryostat 404 (see FIG. 4B). In certain embodiments, connection box 410 can be designed as a slidable container as shown in FIG. 4B. Suitable cooling systems, which includes the refrigeration unit 406, pump 408, and cryostat 404 described above, are describe more fully in U.S. Pat. Nos. 6,347,522 and 6,625,992, both of which are incorporated by reference herein in their entireties. Additional details regarding the cooling systems of U.S. Pat. Nos. 6,347,522 and 6,625,992 can also be found in U.S. Pat. Nos. 5,482,919; 6,023,934; and 6,173,577, all of which are incorporated by reference herein in their entireties.

Figure 4C:
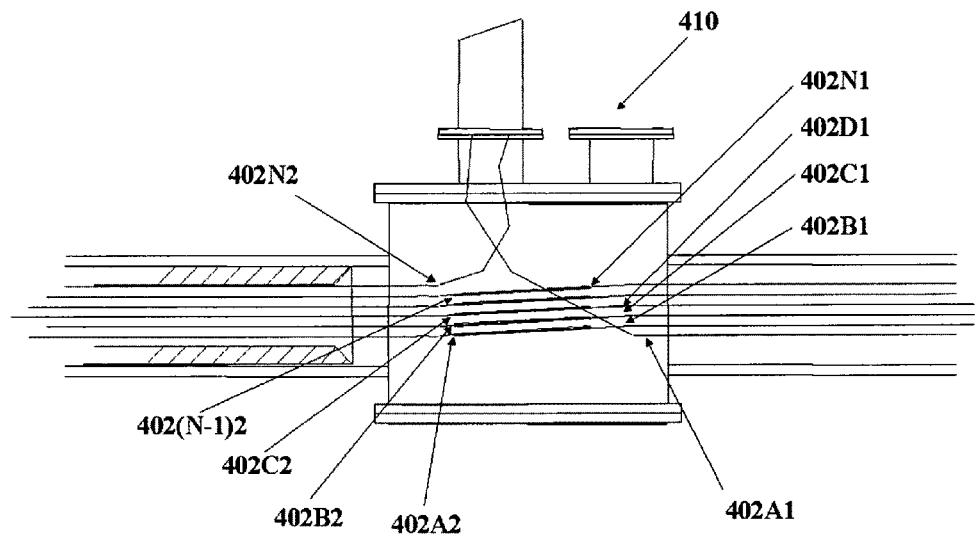
FIGS. 4C and 4D show different embodiments of how the ends of HTS tapes can be connected to form a magnetic-field generating cable in accordance with certain embodiments of the present invention.

FIG. 4C further shows a magnified view of the ends of the HTS tapes 402 in connection box 410. As shown, each individual ends of the HTS tapes 402A through 402N are connected in series with each other. For example, HTS tapes can be connected in series so that the second end of the first HTS tape 402A2 connects to the first end of the second HTS tape 402B1, the second end of the second HTS tape 402B2 connects to the first end of the third HTS tape 402C1, the second end of the third HTS tape 402C2 connects to the first end of the fourth HTS tape 402D1, and so forth until the second end of the (N-1)$^{th}$ cable 402(N-1)2 is connected to the first end of the N$^{th}$ cable 402N1, where the magnetic field generating cable contains at least N number of loops or turns of the HTS tapes. It should be noted that the magnetic-field generating cable can contain a greater number of HTS tapes than the N number of series connections (i.e. N number of loops or turns) made. The first end of the first HTS 402A1 and the second end of the N$^{th}$ HTS tape 402N2 can be connected to current leads (i.e., terminals) into and out of a power source (not shown). Connecting the HTS tapes in series as described herein effectively allows the formation of a large wound coil magnet.

Figure 4D:
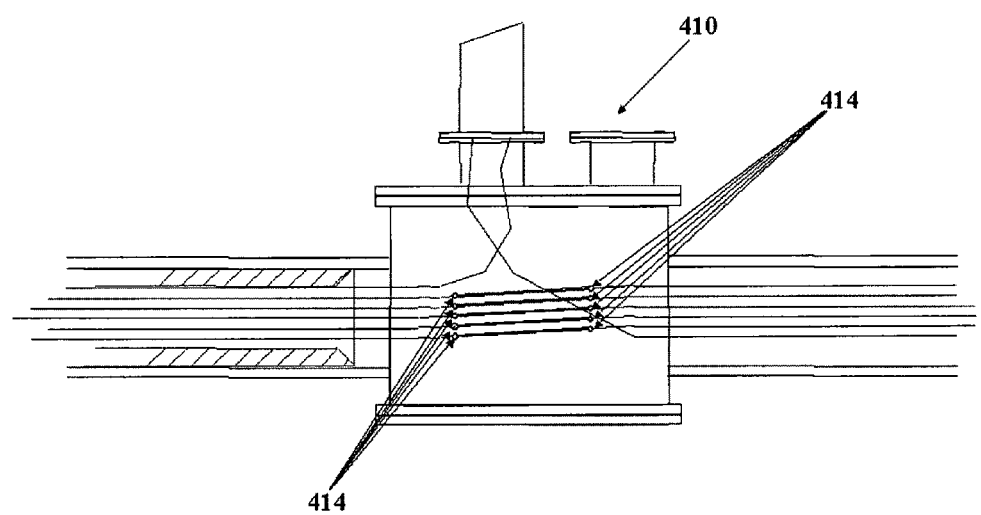

The ends of the HTS tapes may be connected to each other in any suitable means. For example, the ends of the HTS tape may be connected by soldering them together with low resistance solder. Alternatively, the ends of the HTS tapes may be physically joined and crimped (pressed together) without fracturing the HTS tapes. In another embodiment, as shown in FIG. 4D, a connection box 410 may be utilized wherein pressure-contact plugs 414 (i.e., acting as "female jacks") are arranged to receive ends of the HTS tapes 402A2 through 402N1 (i.e., acting as "male jacks"). Other suitable means for forming a connection between the HTS tapes will be readily apparent to one of ordinary skill in the art. For example, in certain embodiments, more than one HTS cable may be connected using one connection box 410, where the connection box 410 may contain sufficient number of plugs to allow two, three, four, etc., number of HTS cables to be connected.

Figure 4E:
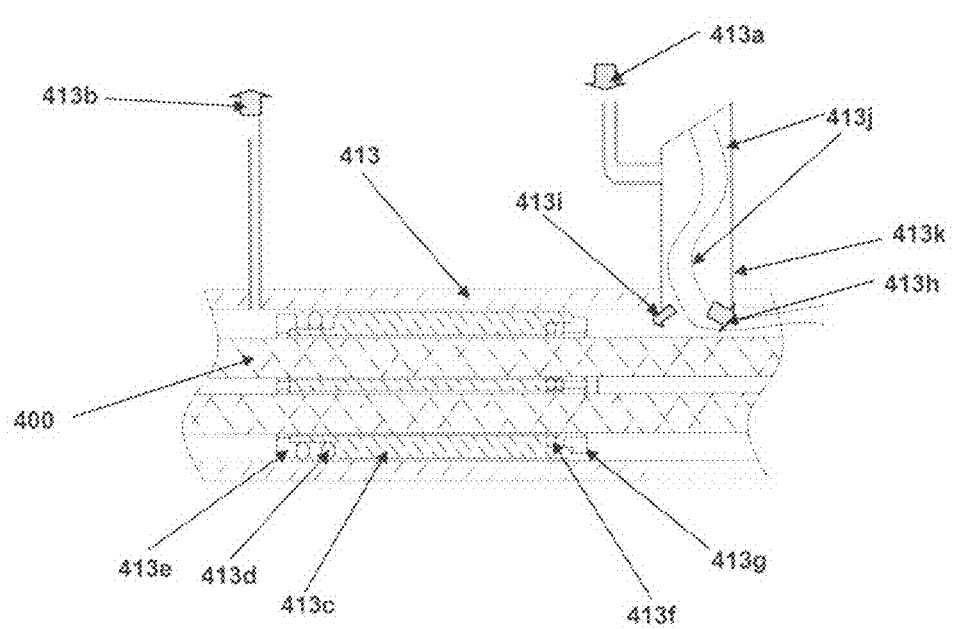
FIG. 4E shows a flow restrictor in accordance with certain embodiments of the present invention.

In certain embodiments, restrictor 413 may be designed to control the percentage of the bypassing cooling gas by varying the gap between the outside diameter of the restrictor and the inner diameter of cryostat. As shown in FIG. 4E, a circulating mechanism can be utilized to minimize any "hot" sections between inlet 413a and outlet 413b. Moreover, restrictor 413 may also allow control of the flow of the cooling gas so that excessive flow is not introduced between inlet 413a and outlet 413b. FIG. 4E further shows a restrictor body 413c, outer seal ring 413d, outer seal cap 413e, inner seal ring 413f and inner seal cap 413g. The inlet flow 413a can also be divided into two streams. The first stream 413h can circulate in a longer path (e.g., around the length of HTS cable 400) while the second stream 413i can flow through a shorter path (e.g., the length of restrictor body 413c). The flow resistance of restrictor can determine the flow distribution between streams 413h and 413i, which can be controlled by tightening the inner seal cap 413g and/or outer seal cap 413e.

In certain embodiments, restrictor body 413c, inner seal cap 413g and outer seal cap 413e can be made from various materials, such as a continuous filament glass cloth embedded in an epoxybinder (e.g., G10). Both inner seal RING 413f and outer seal ring 413d can also be made from various materials such as fluoropolymers (e.g., GORE-TEX). The percentage of bypassing cooling gas (second stream 413i) can be controlled to be between 5%-10% of total flow.

The current leads 413j can be cooled by forced gas flow as shown in FIG. 4E. In this arrangement, the flow stream can be introduced at lower section of current leads, which is contained in a small diameter tube 413k. The small tube diameter can be used to enhance the heat transfer coefficient between gas stream (before splitting to 413h and 413i) and current leads 413j.

EXAMPLES

Example 1

Several different HTS cables of the present invention were fabricated as shown in Table 1. Generally, the BSCCO-based tape widths were fabricated as shown in Table 1 below. The YBCO-based HTS tapes were made into 4 cm wide tapes and slit to smaller sizes ranging from about 3 mm to 10 mm (e.g., see last example shown in Table 1 below), which are comparable to the widths of the BSCCO-based tapes.

TABLE 1

HTS cables fabricated from BSCCO-based HTS tapes having $I_c$ of about 100 to 200 A at 77K and from YBCO-based HTS tapes having $I_c$ per width of 150 to 500 A/cm at 77K.

| | | HTS Tape | | | External | Rated total |
|---|---|---|---|---|---|---|
| HTS Cable | Type | Width (mm) | Height (mm) | Number of Tapes[1] | Diameter[2] (mm) | current at 77K |
| Three rhomboidal stack (H1) | Ag-BSCCO | 3.8 to 4.5 | 0.18 to 0.28 | 20 to 60 | 8 to 12 | 1,000 to 8,000 |
| Three rhomboidal stack (H1) | Ag-BSCCO with 75 μm lamination strips | 4.0 to 5.0 | 0.33 to 0.45 | 15 to 45 | 9 to 14 | 800 to 6,000 |
| Three rhomboidal | Ag-BSCCO with 25 μm | 4.0 to 5.0 | 0.23 to 0.35 | 18 to 60 | 9 to 14 | 900 to 8,000 |

TABLE 1-continued

HTS cables fabricated from BSCCO-based HTS tapes having $I_c$ of about 100 to 200 A at 77K and from YBCO-based HTS tapes having $I_c$ per width of 150 to 500 A/cm at 77K.

| HTS Cable | Type | HTS Tape Width (mm) | HTS Tape Height (mm) | Number of Tapes[1] | External Diameter[2] (mm) | Rated total current at 77K |
|---|---|---|---|---|---|---|
| stack (H1) | lamination strips | | | | | |
| Twelve rhomboidal stack (H2) | Ag-BSCCO with 25 μm lamination strips | 4.0 to 5.0 | 0.23 to 0.35 | 70 to 240 | 17 to 24 | 3,000 to 30,000 |
| Three rhomboidal stack (H1) | YBCO | 3.0 to 10 | 0.15 to 0.35 | 30 to 180 | 7 to 22 | 800 to 60,000 |

[1] With 0 to 150 μm separation material
[2] With 0.5 mm helical wrap

Figure 5A:
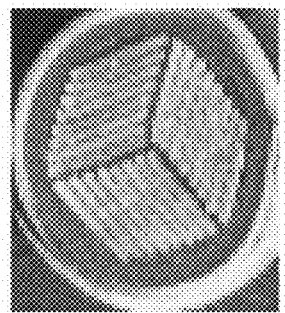
FIGS. 5A and 5B show images of a HTS cable that was fabricated in accordance with certain embodiments of the present invention.
Figure 5B:
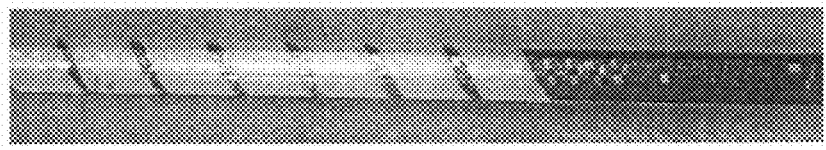

As shown in a photograph of an exemplary HTS cable of FIG. 5A, each HTS cable contained three rhomboidal stacks of eight HTS tapes each to form a H1 stack, when viewed along the cable axis. FIG. 5B shows the three rhomboidal stacks helically wrapped with polytetraflouroethylene (TEFLON) wrap when viewed perpendicular to the cable axis. The HTS cable was twisted to impart a final axial twist pitch that was about 1 twist per meter and was initially twisted to more than one full 360 degree twist per meter (about 2.5 full twists per meter) to account for a spring-back effect.

The resulting HTS tapes utilized in the HTS cables performed without significant degradation. For example, the $I_c$ of the Ag-BSCCO-based HTS tape before assembly was about 120 A. The $I_c$ of the Ag-BSCCO-based HTS tape after assembly was about 120 A when measured without current flowing in the other HTS tapes. When measured with the current flowing in the other HTS tapes, the $I_c$ decreased to about 80 A, most likely due to the significantly greater self-field that arose from the other HTS tapes.

Figure 6:
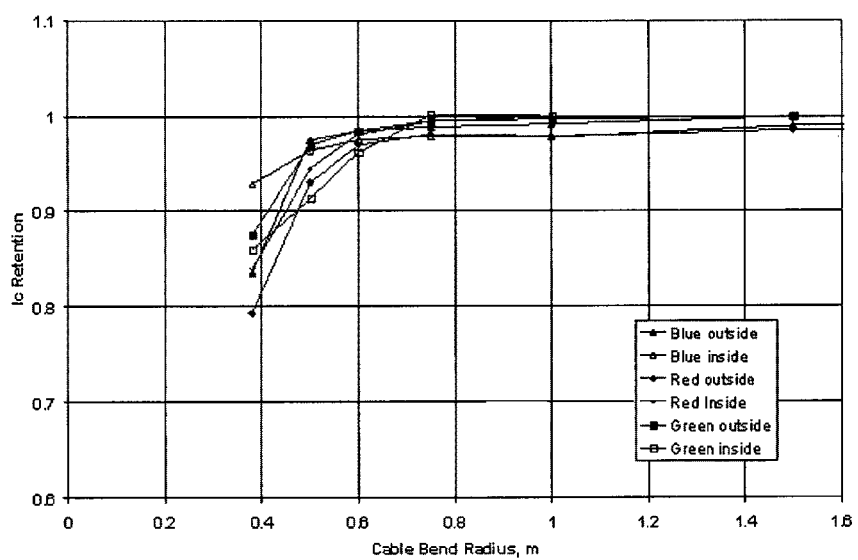
FIG. 6 shows results of the critical current as a function of the bend radius of the HTS cable in accordance with certain embodiments of the present invention.

Bend tests were also conducted on the H1 stack HTS cables made from Ag-BSCCO with 75 μm lamination strips. Three different cables, color coded as blue, red, and green, were tested. Several HTS tapes located near the inner edge of each rhomboid as well as near the outer edge of each rhomboid in the hexagonal structure were measured. For example, "blue outside" refers to HTS tapes in the blue color-coded cable that were near the outer edge of the rhomboid in the hexagonal structure. "Red inside" refers to HTS tapes in the red color-coded cable that were near the inner edge of the rhomboid in the hexagonal structure. As shown in FIG. 6, better than 95% $I_c$ retention was observed at 1.5 meter bend diameter. Moreover, about 80-90% $I_c$ retention was observed at 0.4 meter bend radius.

In addition, it was observed by manual handling that HTS cables were much more flexible after the twist was imparted along the axis of the cable, requiring significantly less force to bend. Hence, the HTS cables were much easier to handle after twisting.

Example 2

Figure 7A:
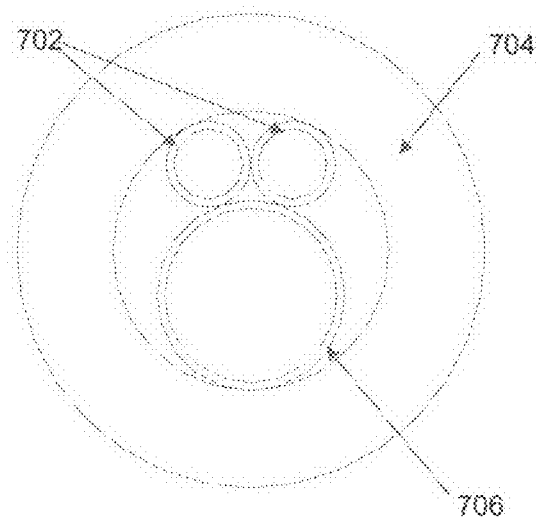
FIGS. 7A and 7B show images of a magnetic-field generating cable having two HTS cables and an optional spacer lying inside a cryostat in accordance with certain embodiments of the present invention.
Figure 7B:
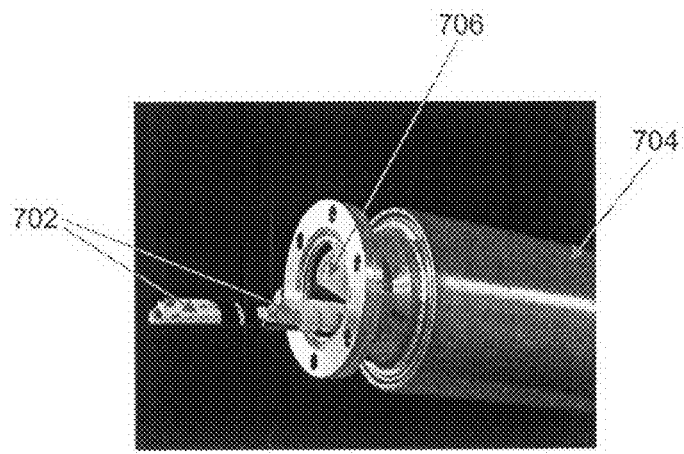
Figure 8:
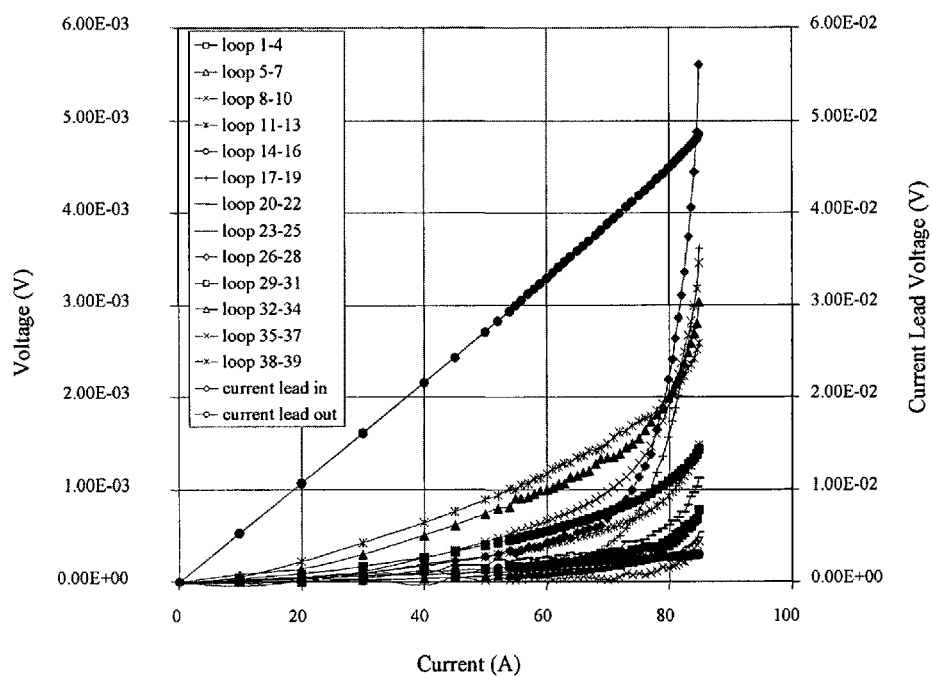
FIG. 8 shows the current flowing through HTS tapes as a function of voltage at 75K to obtain a critical current of the HTS tapes in accordance with certain embodiments of the present invention.
Figure 9:
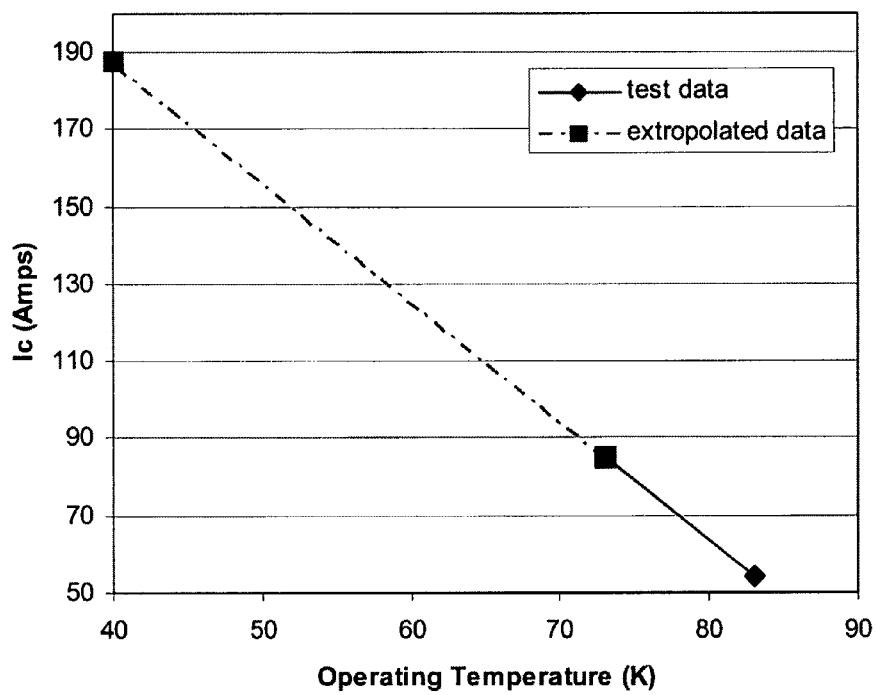
FIG. 9 shows the critical current of HTS tapes in a magnetic-field generating cable measured and extrapolated as a function of temperature in accordance with certain embodiments of the present invention.

A magnetic-field generating cable having 39 HTS tapes serially connected to each other was fabricated as shown in FIGS. 4A, 4C, 7A, and 7B. As shown in FIGS. 7A and 7B, two 40 meter long HTS cables 702 and a spacer 706 (to minimize movement of the HTS cables) were fitted into a flexible cryostat. Each HTS cable had three rhomboidal stacks (to form a H1 stack) and each rhomboidal stack had nine HTS tapes. Hence, among the 54 possible connections, 39 series connections were made to form 39 loops or turns of HTS tapes. The ends of the HTS tapes were serially connected by solder and cooled helium was pumped into the cryostat. The resulting magnetic-field generating cable had the following characteristics at about 40K:

Outer diameter of the HTS cable: 66 mm
Number of HTS tape connected in series (number of loops or turns formed): 39
Amp Turn with DC: 4095 Amp-turn
Current applied to each HTS tape loop: 105 A (=4095 Amp-turns/39 turns)
Minimum bending radius: 550 mm
Operating pressure: 80 psig
HTS cable inductance: 80 mH The $I_c$ of several HTS tapes formed into loops as described above was measured at 75K and 85K. FIG. 8 shows a measured I-V curve obtained at 75 K which shows an $I_c$ value of about 85 A. $I_c$ value of the HTS tapes was also determined at 85K in a similar manner. From these experimental values, the $I_c$ value at 40K was extrapolated, assuming a linear relationship, to be about 180 A (see FIG. 9). Hence, from the extrapolated graph shown in FIG. 9, the maximum projected current at 40K and the maximum operating temperature to achieve 4000 Amp-Turn can be estimated as shown below.

Figure 10:
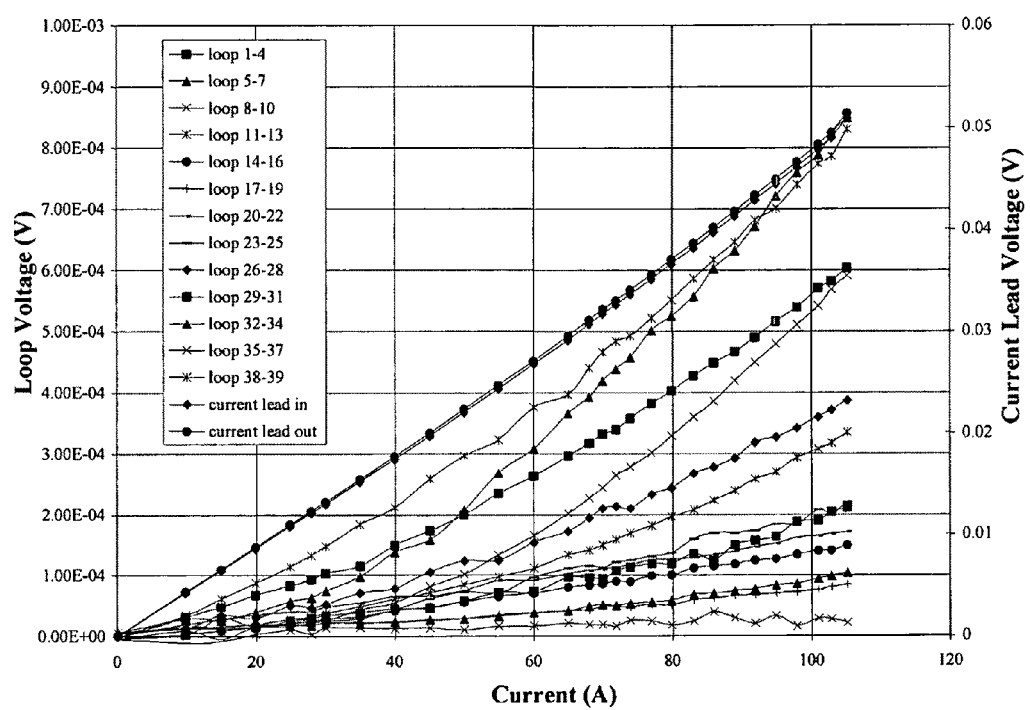
FIG. 10 shows the voltage drops of different HTS loops and current leads that occurs across a magnetic-field generating cable when about 105 A of current is supplied at an average operating temperature of about 40 K in accordance with certain embodiments of the present invention.

Maximum projected current at 40K: 7020 Amp-turn (=180 A×39 turns)
Maximum operating temperature at 4000 Amp-Turn: ~65 K It should be noted that before assembly into a magnetic-field generating cable, each HTS tapes had an initial $I_c$ value of about 120 A at 75K as opposed to the measured value of 85 A at 75K. Part or all of this decline may be due to the suppression of $I_c$ due to the higher magnetic field of the cable, or it may in part be due to some damage to the wires at the connections. Regardless, FIG. 10 shows that such degradation is not likely to be a serious concern during operation as the total voltage drop along the current leads (not encompassing the superconducting loops) was about 0.1 V (=0.05 V+0.05 V shown in the right hand vertical axis) when about 105 A of current was supplied at an average operating temperature of about 40K. In contrast, the total voltage drop that was measured through all of the loops (left hand vertical axis) was only about $4.58 \times 10^{-3}$ V when about 105 A of current was supplied at an average operating temperature of about 40 K.

Figure 11:
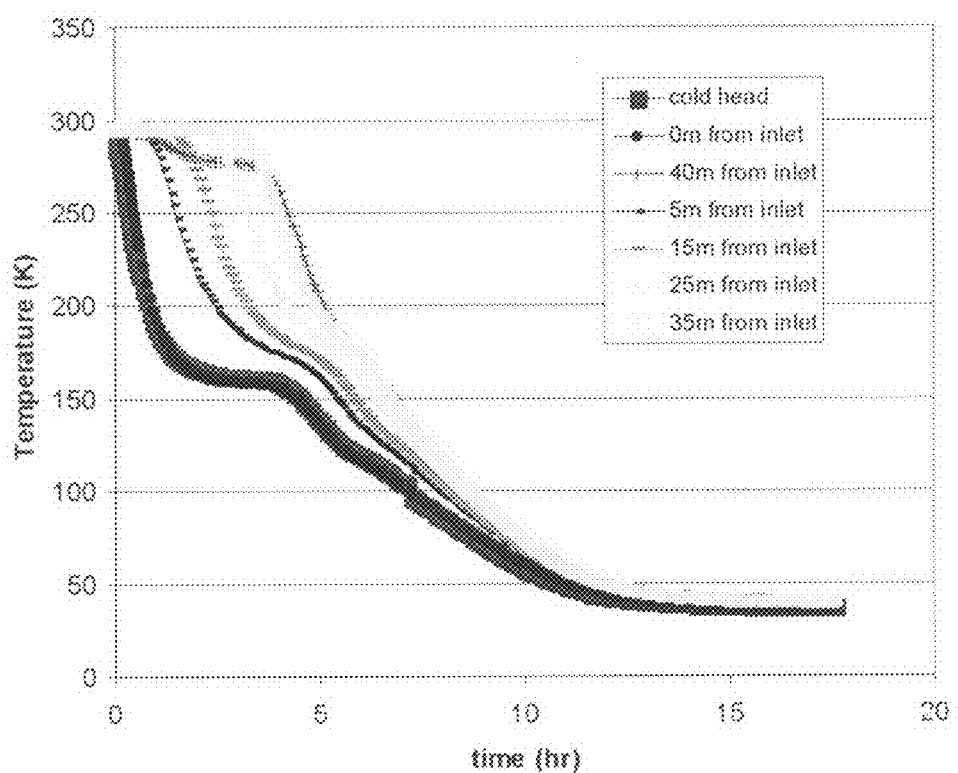
FIG. 11 shows the time that it takes to cool down a 40 meter magnetic-field generating cable from room temperature to about 40 K in accordance with certain embodiments of the present invention.
Figure 11:
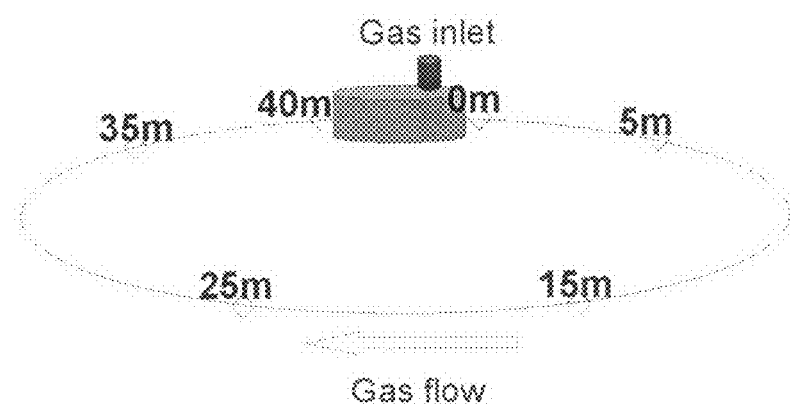

FIG. 11 shows that the entire magnetic-field generating cable was cooled to about 40 K in approximately 12 hours. The temperature difference between the cables at 0 m and 40 m after reaching the final plateau shown in FIG. 11 (i.e., after about 12 hours) was less than 4 K (see curve "A"). When the entire magnetic-field generating cable was cooled down to about 60 K (see curve "B") and 80 K (see curve "C"), the temperature difference between the cables at 0 m and 40 m increased slightly to about 5 K and 7 K, respectively (see FIG. 12).

Figure 13:
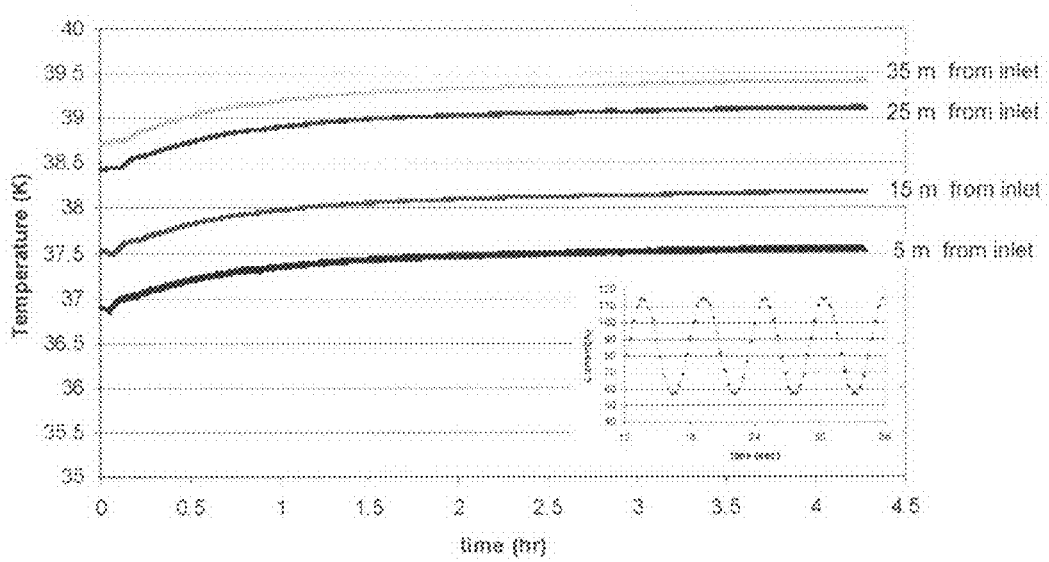
FIG. 13 shows the stability of a magnetic-field generating cable when an alternating current, maintained in a positive current state, is applied to the magnetic-field generating cable in accordance with certain embodiments of the present invention.

To estimate the heat that may accrue during operation, a sinusoidal alternating current (see inset of FIG. 13) was supplied to the magnetic-field generating cable and the temperature rise was measured for about 4 hours. To approximate the worst case scenario, the current was maintained in a positive range value. As shown in FIG. 13, less than 1 K increase in temperature was observed throughout the cable and the temperature appeared to stabilize after about 2 to 2.5 hours.

These examples clearly demonstrate the superiority of the present invention from that of the prior art. Upon review of the description and embodiments of the present invention, those skilled in the art will understand that modifications and equivalent substitutions may be performed in carrying out the invention without departing from the essence of the invention.

INCORPORATION BY REFERENCE

The following documents are hereby incorporated by reference in their entirety: U.S. Pat. No. 5,231,074, issued on Jul. 27, 1993, and entitled. "Preparation of Highly Textured Oxide Superconducting Films from MOD Precursor Solutions;" U.S. Pat. No. 6,022,832, issued Feb. 8, 2000, and entitled "Low Vacuum Process for Producing Superconductor Articles with Epitaxial Layers;" U.S. Pat. No. 6,027,564, issued Feb. 22, 2000, and entitled "Low Vacuum Process for Producing Epitaxial Layers;" U.S. Pat. No. 6,190,752, issued Feb. 20, 2001, and entitled "Thin Films Having Rock-Salt-Like Structure Deposited on Amorphous Surfaces;" U.S. Pat. No. 6,537,689, issued Mar. 25, 2003, and entitled "Multi-Layer Superconductor Having Buffer Layer With Oriented Termination Plane;" PCT Publication No. WO 00/58530, published on Oct. 5, 2000, and entitled "Alloy Materials;" PCT Publication No. WO/58044, published on Oct. 5, 2000, and entitled "Alloy Materials;" PCT Publication No. WO 99/17307, published on Apr. 8, 1999, and entitled "Substrates with Improved Oxidation Resistance;" PCT Publication No. WO 99/16941, published on Apr. 8, 1999, and entitled "Substrates for Superconductors;" PCT Publication No. WO 98/58415, published on Dec. 23, 1998, and entitled "Controlled Conversion of Metal Oxyfluorides into Superconducting Oxides;" PCT Publication No. WO 01/11428, published on Feb. 15, 2001, and entitled "Multi-Layer Articles and Methods of Making Same;" PCT Publication No. WO 01/08232, published on Feb. 1, 2001, and entitled "Multi-Layer Articles And Methods Of Making Same;" PCT Publication No. WO 01/08235, published on Feb. 1, 2001, and entitled "Methods And Compositions For Making A Multi-Layer Article;" PCT Publication No. WO 01/08236, published on Feb. 1, 2001, and entitled "Coated Conductor Thick Film Precursor;" PCT Publication No. WO 01/08169, published on Feb. 1, 2001, and entitled "Coated Conductors With Reduced A.C. Loss;" PCT Publication No. WO 01/15245, published on Mar. 1, 2001, and entitled "Surface Control Alloy Substrates And Methods Of Manufacture Therefore;" PCT Publication No. WO 01/08170, published on Feb. 1, 2001, and entitled "Enhanced Purity Oxide Layer Formation;" PCT Publication No. WO 01/26164, published on Apr. 12, 2001, and entitled "Control of Oxide Layer Reaction Rates;" PCT Publication No. WO 01/26165, published on Apr. 12, 2001, and entitled "Oxide Layer Method;" PCT Publication No. WO 01/08233, published on Feb. 1, 2001, and entitled "Enhanced High Temperature Coated Superconductors;" PCT Publication No. WO 01/08231, published on Feb. 1, 2001, and entitled "Methods of Making A Superconductor;" PCT Publication No. WO 02/35615, published on Apr. 20, 2002, and entitled "Precursor Solutions and Methods of Making Same;" PCT Publication No. WO 2005/121414, published on Dec. 22, 2005, and entitled "Deposition of Buffer Layers on Textured Metal Surfaces;" PCT Publication No. WO 2005/081710, published on Sep. 9, 2005, and entitled "Oxide Films with Nanodot Flux Pinning Centers;" U.S. Pat. No. 6,436,317, issued on Aug. 20, 2002, and entitled, "Oxide Bronze Compositions And Textured Articles Manufactured In Accordance Therewith;" U.S. Provisional Patent Application Ser. No. 60/309,116, filed on Jul. 31, 2001, and entitled "Multi-Layer Superconductors And Methods Of Making Same;" U.S. Pat. No. 6,797,313, issued on Sep. 28, 2004, and entitled "Superconductor Methods and Reactor;" U.S. Provisional Patent Application Ser. No. 60/308,957, filed on Jul. 31, 2001, and entitled "Superconductor Methods and Reactors;" U.S. Provisional Patent Application Ser. No. 60/166,297, filed on Nov. 18, 1999, and entitled "Superconductor Articles and Compositions and Methods for Making Same;" U.S. Pat. No. 6,974,501, issued on Dec. 13, 2005, and entitled "Superconductor Articles and Compositions and Methods for Making Same;" U.S. patent application Ser. No. 10/955,866, filed on Sep. 29, 2004, and entitled "Dropwise Deposition of a Patterned Oxide Superconductor;" U.S. patent application Ser. No. 11/241,636, filed on Sep. 30, 2005, and entitled "Thick Superconductor Films with Improved Performance;" U.S. patent application Ser. No. 10/955,875, filed on Sep. 29, 2004, and entitled "Low AC Loss Filamentary Coated Superconductors;" U.S. patent application Ser. No. 10/955,801, filed on Sep. 29, 2004, and entitled "Stacked Filamentary Coated Superconductors;" U.S. Provisional patent application Ser. No. 60/667,001, filed on Mar. 31, 2005, and entitled "Mesh-Type Stabilizer for Filamentary Coated Superconductors;" U.S. patent application Ser. No. 11/193,262, filed on Jul. 29, 2005, and entitled "Architecture for High Temperature Superconducting Wire;" U.S. Provisional patent application Ser. No. 60/703,815, filed Jul. 29, 2005, and entitled "High Temperature Superconducting Wires and Coils;" U.S. Provisional patent application Ser. No. 60/703,836, filed Jul. 29, 2005, and entitled "Thick Superconductor Films With Improved Performance;" PCT Publication No. WO 06/021003, published on Aug. 19, 2005, and entitled "Stacked Filamentary Coated Superconductors;" PCT Publication No. WO 06/023826, published on Aug. 19, 2005, and entitled "Low AC Loss Filamentary Coated Superconductors;" U.S. Provisional patent application Ser. No. 60/757,855, filed Jan. 10, 2006, and entitled "Method of Patterning Oxide Superconducting Films;" U.S. patent application Ser. No. 11/393,626, filed Mar. 30, 2006, and entitled "MeshOType Stabilizer for Filamentary Coated Superconductors;" U.S. patent application Ser. No. 11/490,779, filed Jul. 21, 2006, and entitled "Fabrication of Sealed High Temperature Superconductor Wires;" U.S. Provisional patent application Ser. No. 60/832,716, filed Jul. 21, 2006, and entitled "High Current, Compact Flexible Conductors Containing High Temperature Superconducting Tapes;" U.S. Provisional patent application Ser. No. 60/832,724, filed Jul. 21, 2006, and entitled "Low Resistance Splice for High Temperature Superconductor Wires;" U.S. Provisional patent application Ser. No. 60/832,871, filed Jul. 25, 2006, and entitled "High Temperature Superconductors Having Planar Magnetic Flux Pinning Centers and Methods For Making The Same;" U.S. Provisional patent Application Ser. No. 60/866,148, filed Nov. 16, 2006, and entitled "Electroplated High-Resistivity Stabilizers In High Temperature Superconductors And methods Thereof;" U.S. patent application Ser. No. 11/728,108, filed Mar. 23, 2007, and entitled "Systems and Methods For Solution-Based Deposition of Metallic Cap Layers For High Temperature Superconductor Wires;" U.S. Provisional patent application Ser. No. 60/922,145, filed Apr. 6, 2007, and entitled "Composite Substrates For High Temperature Superconductors Having Improved Properties," and U.S. patent application Ser. No. (TBA), filed concurrently herewith, entitled "Low Resistance Splice for High Temperature Superconductor Wires."

What is claimed is:

1. A cable employed to generate a magnetic field, said cable comprising:
    a plurality of high-temperature superconducting (HTS) stacks arranged to form a superstructure, each of said HTS stacks comprising a plurality of HTS tapes substantially parallel to a plane formed by the width and the length of individual HTS tapes,
    wherein a first HTS tape of the HTS stack is displaced a distance in the width direction from an HTS tape positioned above the individual HTS tape in the HTS stack,
    wherein an end of an HTS tape from the plurality of HTS tapes of a first HTS stack is connected in series with an end of a second HTS tape located in a second HTS stack.

2. The cable of claim 1, wherein each HTS tape of the HTS stack is displaced in the same direction along the width direction.

3. The cable of claim 1, wherein each HTS tape of the HTS stack is displaced by substantially the same distance.

4. The cable of claim 1, wherein the plurality of HTS tapes form a stack having a rhomboid-shaped cross-section.

5. The cable of claim 1, wherein the plurality of stacks are arranged so that a plane formed by the width and the length of the plurality of HTS tapes is nearly parallel to the local perimeter of the cross-section of the superstructure.

6. The cable of claim 1, wherein the superstructure has a hexagonal cross-sectional structure.

7. The cable of claim 1, wherein the superstructure has a triangular cross-sectional structure.

8. The cable of claim 1, wherein the superstructure is twisted about the axis of the cable.

9. The cable of claim 1, wherein the cable comprises at least N HTS tapes; and
    a first end of the $(N-1)^{th}$ HTS tape is connected in series to a second end of a $N^{th}$ HTS tape;
    the $N^{th}$ HTS tape and the $(N-1)^{th}$ HTS tape being located in any one of the plurality of the HTS stacks.

10. The cable of claim 9, wherein the HTS tapes are connected to each other utilizing
    a connection box having plugs capable of receiving the first end of the $(N-1)^{th}$ HTS tape and the second end of the $N^{th}$ HTS tape.

11. A degaussing system comprising:
    the cable of claim 1;
    a cooling system for maintaining the HTS tapes in a superconducting state; and
    a power supply for providing a controlled current into the HTS tapes.

12. The degaussing system of claim 11, wherein the cooling system comprises
    a cryostat to house the cable,
    a coolant,
    a refrigerating mechanism to cool the coolant, and
    a delivery mechanism to deliver the coolant to the HTS tapes.

13. The degaussing system of claim 12, wherein the cryostat further comprises a restrictor capable of dividing a flow of coolant into two different flow streams.

14. The degaussing system of claim 13, wherein the restrictor comprises
    a restrictor body,
    at least one seal ring, and
    at least one seal cap.

15. The degaussing system of claim 14, wherein the at least one seal cap can be tightened to control the relative amount of coolant flowing in the two different flow streams.

16. The degaussing system of claim 14, wherein the at least one seal cap and the restrictor body comprise a composite material.

17. The degaussing system of claim 14, wherein the at least one seal ring comprises a fluoropolymer.

18. The degaussing system of claim 12, wherein
    the power supply provides current into the HTS tapes through at least two current leads;
    the delivery mechanism comprises an inlet for delivering the coolant to the HTS tapes; and
    the inlet and the current leads are arranged so that the coolant is delivered to some portion of the current leads.

19. The cable of claim 1, wherein the individual HTS tapes are multifilament tapes.

20. The cable of claim 9, wherein the HTS tapes are connected to each other using solder.

21. The cable of claim 9, wherein the HTS tapes are connected to each other using physical pressure to press the first end of the $(N-1)^{th}$ HTS tape and the second end of the $N^{th}$ HTS tape into each other.

* * * * *